United States Patent
Kuang et al.

(10) Patent No.: US 9,413,992 B2
(45) Date of Patent: Aug. 9, 2016

(54) HIGH DYNAMIC RANGE IMAGE SENSOR WITH FULL RESOLUTION RECOVERY

(71) Applicant: OMNIVISION TECHNOLOGIES, INC., Santa Clara, CA (US)

(72) Inventors: Jiangtao Kuang, Sunnyvale, CA (US); Donghui Wu, Sunnyvale, CA (US); Chao Wang, Shanghai (CN); Eiichi Funatsu, San Jose, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 255 days.

(21) Appl. No.: 14/243,480

(22) Filed: Apr. 2, 2014

(65) Prior Publication Data
US 2014/0340553 A1 Nov. 20, 2014

Related U.S. Application Data

(60) Provisional application No. 61/825,419, filed on May 20, 2013.

(51) Int. Cl.
*H04N 5/228* (2006.01)
*H04N 5/355* (2011.01)
*H04N 5/235* (2006.01)

(52) U.S. Cl.
CPC ......... *H04N 5/35554* (2013.01); *H04N 5/2355* (2013.01); *H04N 5/35545* (2013.01); *H04N 5/35563* (2013.01)

(58) Field of Classification Search
CPC .................. H04N 5/35545; H04N 5/35563
See application file for complete search history.

(56) References Cited

U.S. PATENT DOCUMENTS

| 8,803,985 | B2 | 8/2014 | Kaizu et al. | |
|---|---|---|---|---|
| 2007/0285526 | A1* | 12/2007 | Mann | H04N 5/23245 348/222.1 |
| 2009/0091645 | A1* | 4/2009 | Trimeche | H04N 5/235 348/273 |
| 2010/0201862 | A1* | 8/2010 | Hatabu | H04N 5/3535 348/311 |
| 2012/0218426 | A1* | 8/2012 | Kaizu | H04N 5/35554 348/208.4 |
| 2012/0287294 | A1* | 11/2012 | Kaizu | H04N 5/2355 348/208.4 |
| 2013/0038761 | A1* | 2/2013 | Tanaka | H04N 5/35563 348/242 |
| 2013/0135504 | A1* | 5/2013 | Nakata | H04N 5/35554 348/311 |
| 2013/0329128 | A1* | 12/2013 | Kaizu | H04N 5/374 348/367 |
| 2015/0015754 | A1* | 1/2015 | Fujita | H04N 5/367 348/302 |

FOREIGN PATENT DOCUMENTS

CN 102780849 A 11/2012

OTHER PUBLICATIONS

TW 103117501—Taiwanese Office Action and Search Report, with English Translation, Issued Nov. 23, 2015, 16 pages.

* cited by examiner

*Primary Examiner* — Twyler Haskins
*Assistant Examiner* — Wesley J Chiu
(74) *Attorney, Agent, or Firm* — Blakely Sokoloff Taylor & Zafman LLP

(57) ABSTRACT

A method of reading pixel data from a pixel array includes exposing each one of a plurality of regions of pixels a respective exposure time. Pixel data is read from the plurality of regions of pixels. The pixel data is interpolated from a first one of the plurality of regions of pixels to determine the pixel data of the regions of pixels other than the first one of the plurality of regions of pixels to generate a first image having the first exposure time. The pixel data is interpolated from the second one of the plurality of regions of pixels to determine the pixel data of the regions of pixels other than the second one of the plurality of regions to generate a second image having the second exposure time. The images are combined to produce a high dynamic range image.

9 Claims, 3 Drawing Sheets

HIGH DYNAMIC RANGE IMAGE SENSOR WITH FULL RESOLUTION RECOVERY

CROSS-REFERENCE TO RELATED APPLICATION

This application claims the benefit of U.S. Provisional Application No. 61/825,419, filed May 20, 2013.

BACKGROUND INFORMATION

1. Field of the Disclosure

The present invention relates generally image sensors. More specifically, examples of the present invention are related to image processing and signal processing techniques utilized in a high dynamic range (HDR) image sensors.

2. Background

Standard image sensors have a limited dynamic range of approximately 60 to 70 dB. However, the luminance dynamic range of the real world is much larger. Natural scenes often span a range of 90 dB and over. In order to capture the highlights and shadows simultaneously, HDR technologies have been used in image sensors to increase the captured dynamic range. The most common techniques to increase dynamic range is to merge multiple exposures captured with standard (low dynamic range) image sensors into a single linear HDR image, which has much larger dynamic range than a single exposure image.

One of the most common HDR sensor solutions would be having multiple exposures into one single image sensor. With different exposure integration times or different sensitivities (for example by inserting neutral density filters), one image sensor could have 2, 3, 4 or even more different exposures in a single image sensor. Multiple exposure images are available in a single shot using this HDR image sensor. However, overall image resolution is decreased using this HDR sensor compared to a normal full resolution image sensor. For example, for an HDR sensor that combines 4 different exposures in one image sensor, each HDR image would be only a quarter resolution of the full resolution image.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1A:
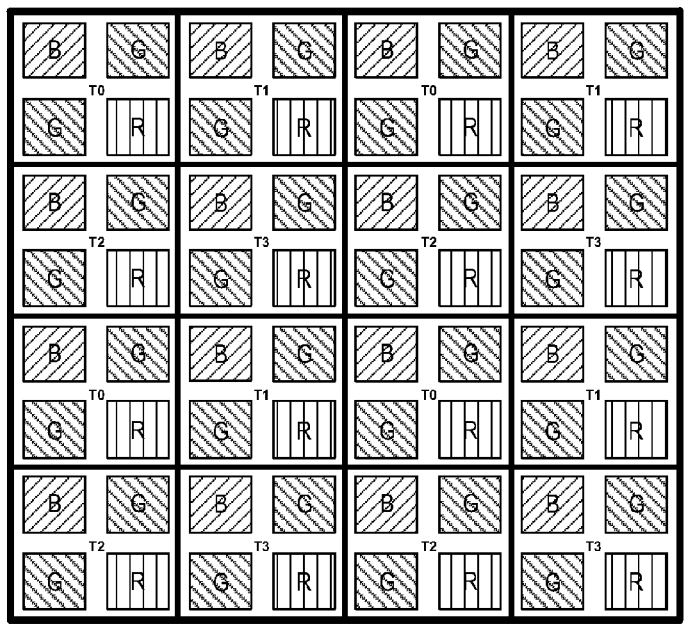
FIG. 1A is a diagram illustrating one example of a four exposure HDR image sensor in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

As will be shown, methods and apparatuses directed to an HDR image sensor having full resolution are disclosed. In the following description, numerous specific details are set forth in order to provide a thorough understanding of the present invention. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," an embodiment, "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. The following is a detailed description of the terms and elements used in the description of examples of the present invention by referring to the accompanying drawings.

As will be shown, examples in accordance with the teachings of the present invention provide image processing techniques that recover the full resolution for an HDR image sensor that include two or more exposures in one single image sensor chip. It is noted that the example techniques described below utilize a four exposure HDR image sensor as an example. It is appreciated of course that an HDR image sensor having any plurality of exposures may also be utilized in accordance with the teachings of the present invention.

Figure 1B:
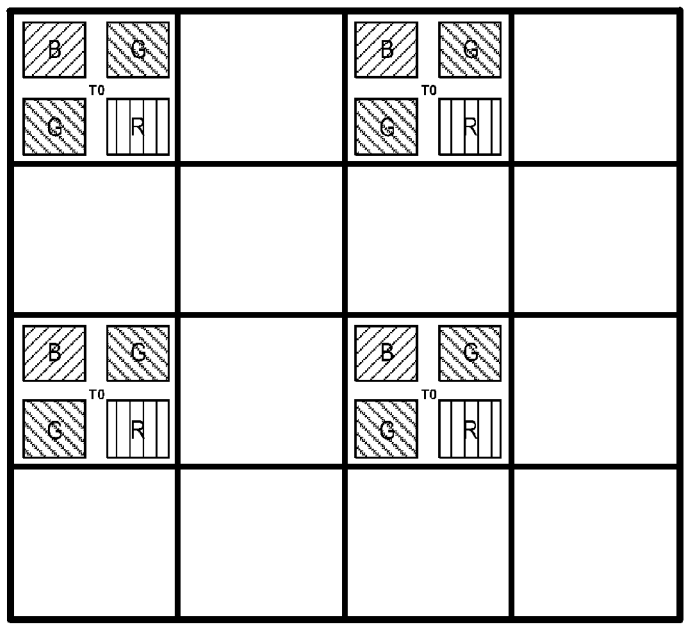
FIG. 1B is a diagram illustrating one example of pixel regions in which there is a first exposure in an example four exposure HDR image sensor in accordance with the teachings of the present invention.

In the example depicted in FIG. 1A, an example four exposure HDR image sensor 100 is illustrated. In the illustrated example, a Bayer pattern is shown for explanation purposes. However it is appreciated that any other color or non-color pattern may also be utilized in accordance with the teachings of the present invention. As shown in the depicted example, image sensor 100 includes a plurality of pixel regions T0, T1, T2 and T3 arranged as shown in a two dimensional array. In the example, it is assumed that images obtained with the plurality of pixel regions T0, T1, T2, and T3 are acquired with exposures E0, E1, E2 and E3, respectively. Referring to the example illustrated in FIG. 1B, it can be appreciated that if an image is captured using only the T0 pixel regions of image sensor 100 in which there is only the exposure E0, only a quarter of the total number of pixels of the image sensor 100 are available. In other words, the other three-quarters of the pixel regions other than the T0 pixel regions are not utilized to capture the image at exposure E0, and as a consequence, the full resolution of image sensor 100 is not captured directly.

Figure 2:
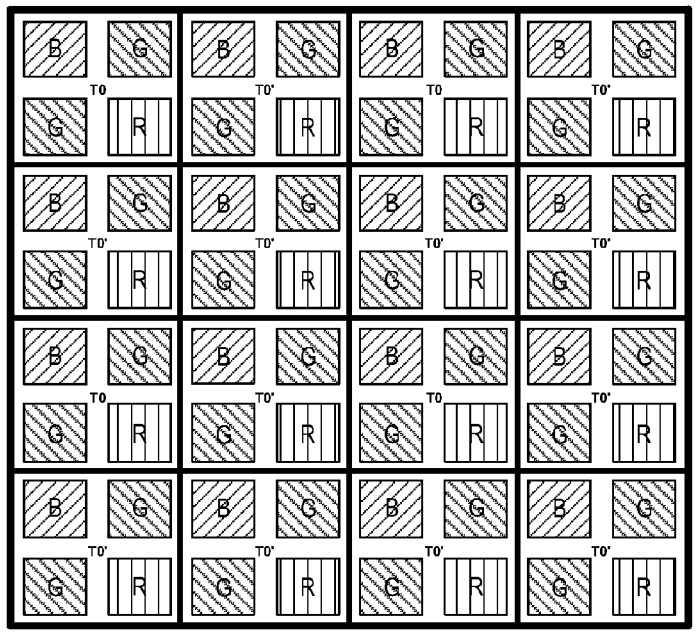
FIG. 2 is a diagram illustrating one example of a four exposure HDR image sensor in which the full resolution of the image sensor is captured utilizing an example upscaling technique in accordance with the teachings of the present invention.

There are a variety of techniques that may be utilized in accordance with the teachings of the present invention to capture the full resolution of image sensor 100 at HDR. For instance, in one example, the full resolution of image sensor 100 may be captured at HDR with upscaling. Scaling is a non-trivial process that involves a trade-off between smoothness and sharpness. Various scaling methods could be utilized, such as for example nearest-neighbor interpolation, bilinear interpolation, spline interpolation, or other vector-based interpolation. In one example, bi-cubic interpolation method could be used to get an up-scaled image for each of the exposures E0, E1, E2, and E3. Assuming that:

$$T0'=\text{upscale}(T0),$$

$$T1'=\text{upscale}(T1),$$

$$T2'=\text{upscale}(T2), \text{ and}$$

$$T3'=\text{upscale}(T3),$$

the image data for the other pixel areas that have different exposures can be recovered in accordance with the teachings of the present invention. To illustrate, FIG. 2 shows an example image sensor 200 in which the image data is recovered using an example upscaling technique for the missing pixel locations, (e.g., the non-T0 pixel regions) with the recovered T0' data for the E0 exposure as shown in accordance with the teachings of the present invention. It is appreciated that recovered T1' data can be used similarly for the non-T1 pixel regions for the E1 exposure, that recovered T2' data can be used similarly for the non-T2 pixel regions for the E2 exposure, and that recovered T3' data can be used similarly for the non-T3 pixel regions for the E3 exposure in accordance with the teachings of the present invention. Therefore, the full resolution of the image sensor 100 can be obtained for all of the exposures E0, E1, E2 and E3 to obtain full resolution HDR information using an example upscaling technique in accordance with the teachings of the present invention.

In another example, pixel substitution could be utilized in the HDR image sensor, where it is assumed that the pixel response is linear with respect to exposure time. In the example, the pixel values of the missing pixel locations can be estimated from the other exposures. For instance, assuming that:

$$r1 = \frac{E0}{E1}$$

$$r2 = \frac{E0}{E2}$$

$$r3 = \frac{E0}{E3}$$

then it can be assumed that $$T0\_1''=r1 \times T1$$

$$T0\_2''=r2 \times T2$$

$$T0\_3''=r3 \times T3$$

Figure 3:
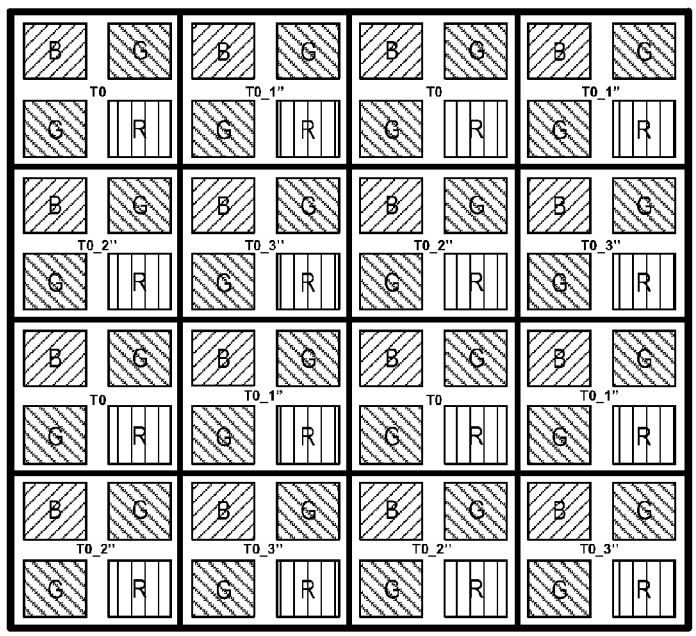
FIG. 3 is a diagram illustrating one example of a four exposure HDR image sensor in which the full resolution of the image sensor is captured utilizing an example pixel data substitution technique in accordance with the teachings of the present invention.

By integrating the estimated values from other exposures and the substituting the missing pixel locations with the estimated value from the other exposures, the full resolution image for T0 can therefore be recovered, as shown in the example illustrated in FIG. 3, which shows an example image sensor 300 in which the image data is recovered using an example pixel data substitution technique for the missing pixel locations in accordance with the teachings of the present invention.

For the remaining exposures E1, E2 and E3, similar pixel data substitution techniques may be utilized to recover the T1, T2 and T3 pixel data in accordance with the teachings of the present invention. However, it is noted that if the longer exposure is saturated, the estimated exposure pixel value is lost since the useful pixel information is clipped by the full well capacity. In this case, the upscaled image pixel value may be utilized instead, using the previously discussed technique, in accordance with the teachings of the present invention.

It is appreciated that the technique of pixel substitution suffers from a poor signal-to-noise ratio (SNR) as the exposure ratio increase. For instance, if E0/E3=64, then E3 has to apply 64× digital gain to get the same digital level of E0, which could have an 18 dB lower SNR compared to E0. Furthermore, if E3 falls into the nonlinear response region of the image sensor, the estimated values for E0_3″ will be inaccurate. On the other hand, the technique of upscaling suffers from decreased sharpness and/or invalid high frequency estimation, which result in zigzag artifacts due to the interpolation.

In another example, the upscaling technique as well as the pixel data substitution techniques may both be utilized based on the exposure ratios to recover the missing pixel information in accordance with the teachings of the present invention. For instance, in one example, $$T0_{recovered} = T0'',$$

$$\text{if } \frac{E0}{E3} < R_{th0};$$

$$T0_{recovered} = (1-w) \times T0'' + w \times T0',$$

$$\text{if } R_{th0} < \frac{E0}{E3} < R_{th1};$$

$$\text{where } w = \frac{\left(\frac{E0}{E3} - R_{th0}\right)}{(R_{th1} - R_{th0})}; \text{ and}$$

$$T0_{recovered} = T0',$$

$$\text{if } \frac{E0}{E3} > R_{th1}.$$

Thus, for an HDR scene, the technique of upscaling may be utilized, while for a low dynamic range scene, the technique of pixel data substitution may be utilized to recover the full resolution of the HDR image sensor in accordance with the teachings of the present invention.

In one example, after recovering the full resolution images for T0, T1, T2 and T3, an HDR combination process may be used to combine the full resolution images for T0, T1, T2 and T3 into a single HDR image. In one example, a tone-mapping process can be performed to compress the dynamic range and produce a normal image that is suitable for display in accordance with the teachings of the present invention.

Figure 4:
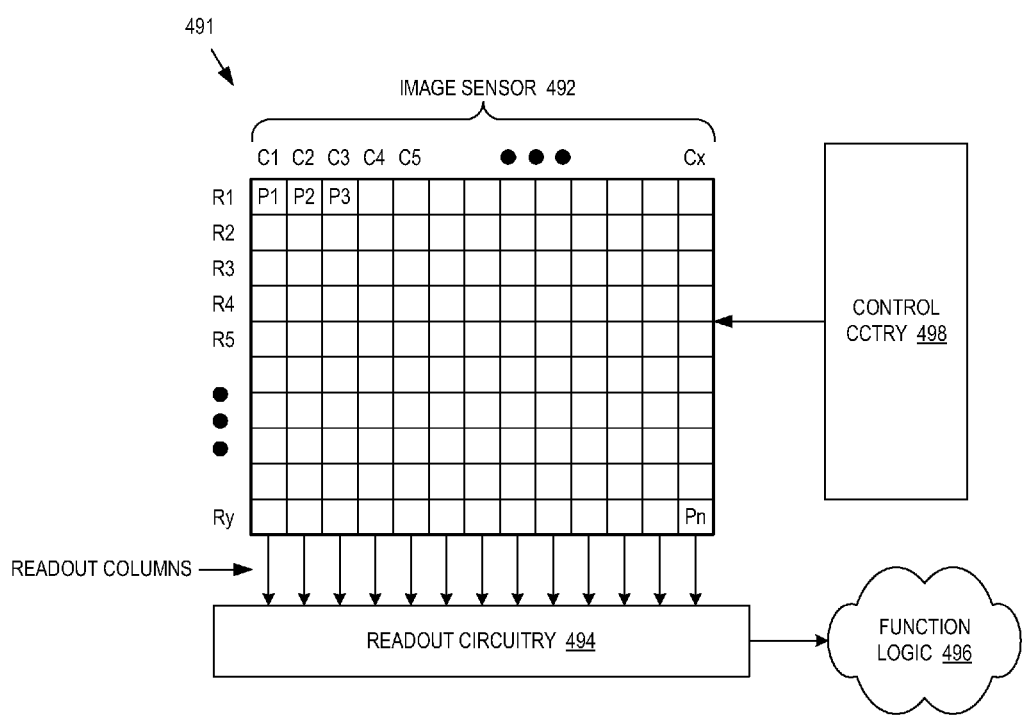
FIG. 4 is a diagram illustrating one example of an imaging system including an image sensor pixel array having fast intra-frame autofocus in accordance with the teachings of the present invention.

FIG. 4 is a diagram illustrating one example of an imaging system 491 including an example HDR image sensor 492 having a plurality of image sensor pixels cells in accordance with the teachings of the present invention. As shown in the depicted example, imaging system 491 includes an HDR image sensor 492 coupled to control circuitry 498 and readout circuitry 494, which is coupled to function logic 496.

In one example, HDR image sensor 492 is a two-dimensional (2D) array of image sensor pixel cells (e.g., pixels P1, P2, P3, ... Pn). It is noted that HDR image sensor 492 may be an example of image sensor 100 of FIGS. 1A-1B or an example of image sensor 200 of FIG. 2, or an example of image sensor 300 of FIG. 3, and that similarly named and numbered elements referenced below are coupled and function similar to as described above. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell P1, P2, P3, ..., Pn has acquired its image data or image charge, the image data is readout by readout circuitry 494 and then transferred to function logic 496. In various examples, readout circuitry 494 may include HDR processing circuitry as discussed above, amplification circuitry, analog-to-digital (ADC) conversion circuitry, or otherwise. Function logic 496 may simply store the image data or even manipulate the image data by applying post image effects (e.g., HDR processing, tone-mapping processing, crop, rotate, remove red eye, adjust brightness, adjust contrast, or otherwise). In one example, readout circuitry 494 may readout a row of image data at a time along readout column lines (illustrated) or may readout the image data using a variety of other techniques (not illustrated), such as a serial readout or a full parallel readout of all pixels simultaneously.

In one example, control circuitry 498 is coupled to HDR image sensor 492 to control operational characteristics of image sensor 492. For example, control circuitry 498 may generate a shutter signal for controlling image acquisition. In one example, the shutter signal is a global shutter signal for simultaneously enabling all pixels within image sensor 492 to simultaneously capture their respective image data during a single acquisition window. In another example, the shutter signal is a rolling shutter signal such that each row, column, or group of pixels is sequentially enabled during consecutive acquisition windows.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of reading pixel data from a pixel array including a plurality of pixels, wherein the plurality of pixels is organized into a plurality of regions of pixels arranged in a pattern in the pixel array, the method comprising:
   exposing each one of a plurality of regions of pixels for a respective one of a plurality of exposure times;
   reading pixel data from the plurality of regions of pixels;
   for each respective one of the plurality of exposure times, determining an exposure ratio for each one of the plurality of regions of pixels, wherein the exposure ratio for each one of the plurality of regions of pixels for each respective one of the plurality of exposure times is equal to respective one of the plurality of exposure times divided by the exposure time for said one of the plurality regions of pixels;
   for each respective one of the plurality of exposure times, substituting the pixel data for each one of the plurality of regions of pixels for which the exposure ratio is less than a first threshold with the pixel data from said one of the plurality of regions of pixels multiplied by the exposure ratio for said one of the plurality of regions of pixels to generate an image in a plurality of images for each respective one of the plurality of exposure times;
   for each respective one of the plurality of exposure times, substituting the pixel data for each one of the plurality of regions of pixels for which the exposure ratio is greater than a second threshold with an interpolation of the pixel data from the one of the plurality of regions of pixels having said respective one of the plurality of exposure times to generate the image in the plurality of images for each respective one of the plurality of exposure times; and
   combining the plurality of images to produce a high dynamic range image.

2. The method of claim 1 further comprising for each respective one of the plurality of exposure times, substituting the pixel data for each one of the plurality of regions of pixels for which the exposure ratio is greater than the first threshold and less than the second threshold with a combination of the pixel data from said one of the plurality of regions of pixels multiplied by the exposure ratio for said one of the plurality of regions of pixels and the interpolation of the pixel data from the one of the plurality of regions of pixels having said respective one of the plurality of exposure times.

3. The method of claim 1 wherein a pixel response of each one of the plurality of pixels in the pixel array is linear with respect to exposure time.

4. The method of claim 1 wherein said combining the plurality of images comprises performing a tone-mapping process on the plurality of images to compress a dynamic range of the high dynamic range image.

5. An imaging system, comprising:
   a pixel array including a plurality of pixels, wherein the plurality of pixels is organized into a plurality of regions of pixels arranged in a pattern in the pixel array;
   control circuitry coupled to the pixel array to control operation of the pixel array, wherein the control circuitry is coupled to expose each one of a plurality of regions of pixels for a respective one of a plurality of exposure times; and
   readout circuitry coupled to the pixel array to readout pixel data from the plurality of regions of pixels, the imaging system coupled to:
      for each respective one of the plurality of exposure times, determine an exposure ratio for each one of the plurality of regions of pixels, wherein the exposure ratio for each one of the plurality of regions of pixels for each respective one of the plurality of exposure times is equal to respective one of the plurality of exposure times divided by the exposure time for said one of the plurality regions of pixels;
      for each respective one of the plurality of exposure times, substituting the pixel data for each one of the plurality of regions of pixels for which the exposure ratio is less than a first threshold with the pixel data from said one of the plurality of regions of pixels multiplied by the exposure ratio for said one of the plurality of regions of pixels to generate an image in a plurality of images for each respective one of the plurality of exposure times;

for each respective one of the plurality of exposure times, substitute the pixel data for each one of the plurality of regions of pixels for which the exposure ratio is greater than a second threshold with an interpolation of the pixel data from the one of the plurality of regions of pixels having said respective one of the plurality of exposure times to generate the image in the plurality of images for each respective one of the plurality of exposure times; and combine the plurality of images to produce a high dynamic range image.

6. The imaging system of claim 5 further comprising function logic coupled to the readout circuitry to store high dynamic range image data readout from the plurality of pixels.

7. The imaging system of claim 5 wherein the imaging system is further coupled to, for each respective one of the plurality of exposure times, substitute the pixel data for each one of the plurality of regions of pixels for which the exposure ratio is greater than the first threshold and less than the second threshold with a combination of the pixel data from said one of the plurality of regions of pixels multiplied by the exposure ratio for said one of the plurality of regions of pixels and the interpolation of the pixel data from the one of the plurality of regions of pixels having said respective one of the plurality of exposure times.

8. The imaging system of claim 5 wherein a pixel response of each one of the plurality of pixels in the pixel array is linear with respect to exposure time.

9. The imaging system of claim 5 wherein the imaging system is further coupled to perform a tone-mapping process on the plurality of images to compress a dynamic range of the high dynamic range image to combine the plurality of images.

* * * * *